April 28, 1970   A. B. FOWLER ET AL   3,509,384
BISTABLE DEVICES
Filed Aug. 31, 1964

INVENTORS
ALAN B. FOWLER
GORDON J. LASHER
BY
Francis J. Thomas
ATTORNEY

United States Patent Office 3,509,384
Patented Apr. 28, 1970

3,509,384
BISTABLE DEVICES
Alan B. Fowler and Gordon J. Lasher, Yorktown Heights, N.Y., assignors to International Business Machines Corporation, New York, N.Y., a corporation of New York
Filed Aug. 31, 1964, Ser. No. 393,303
Int. Cl. H03k 23/12; H01s 3/00
U.S. Cl. 307—312                                            2 Claims

ABSTRACT OF THE DISCLOSURE

The bistable device includes two gallium arsenide injection lasers. Each laser has two reflecting surfaces to form a cavity therebetween and two nonreflecting surfaces. The lasers are arranged in combination with external reflecting surfaces so that the laser output of each laser is applied in a direction which is at right angles to the cavity formed between the reflecting surfaces on the other. When either laser is lasing, its output applied in this way quenches the other laser so that bistability is achieved.

---

This invention relates to bistable devices and, in particular, to devices employing lasers.

The coherent light output of a laser can be quenched by applying coherent light from another laser as described in articles by A. B. Fowler entitled, Quenching of Gallium-Arsenide Injection Lasers in Applied Physics Letters, vol. No. 1, July 1963, at pages 1 through 3; and by C. J. Koester, R. F. Woodcock, E. Snitzer, and H. M. Teager entitled, Interactions Between Two $Nd^{3+}$ Glass Lasers, in the Journal of the Optical Society of America, vol. 52, No. 11, November 1962, on page 1323.

The ability of one laser to quench another laser is used in the present invention as the basis of a bistable device wherein two lasers are cross-coupled such that the light from either laser is permitted to quench the other laser. However, in order to provide a properly operating bistable device, it is necessary that the quenching light be not reflected from the laser which is to be quenched back to the laser which provides the quenching light. These undesired reflections are inhibited in the present invention to provide a highly-stable, laser bistable device. Proper operation also requires a controlled reflectivity in the direction of the lasing mode to provide a quenching beam of correct intensity.

An object of the present invention is to provide laser devices wherein the light from a laser is used to quench another laser.

Another object is to provide laser devices wherein coherent light from a first laser is used to quench another laser in a manner wherein the quenching light is not reflected back to affect the operation of the first laser.

Another object is to provide laser devices wherein coherent light with a controlled intensity from a first laser is used to quench another laser in a manner wherein the quenching light is not reflected back to affect the operation of the first laser.

Another object is to provide a bistable device employing cross-coupled lasers.

Another object is to provide a bistable device employing cross-coupled lasers wherein the quenching light from a laser is not reflected from the laser being quenched back to the quenching laser.

A further object is to provide a bistable device employing cross-coupled lasers with controlled intensity output quenching beams, wherein the quenching beam from a laser is not reflected from the laser being quenched back to the quenching laser.

A further object is to provide a bistable device employing cross-coupled lasers wherein the coherent light produced by each laser is used to quench the other laser, wherein the quenching light is not reflected from the laser being quenched back to the quenching laser, and wherein at least one external reflecting surface is used to control the transmission of light between lasers.

A still further object is to provide a bistable device employing cross-coupled lasers wherein the coherent light produced by each laser is used to quench the other laser, wherein the quenching light is not reflected from the laser being quenched back to the quenching laser, and wherein two external surfaces are used to control the transmission of light between lasers.

The foregoing and other objects, features and advantages of the invention will be apparent from the following more particular description of preferred embodiments of the invention, as illustrated in the accompanying drawings.

The output beam from a laser can be used to quench another laser. When the coherent output of one laser is passed through the active region of the second laser, the second laser is stimulated to emit in the same direction as the incident light. The power added to the amplified incident light from the first laser is subtracted from the power in the normal lasing mode or modes of the second laser to reduce its output beam intensity. This quenching process has a quenching ratio that is defined as the power extracted from the quenched laser divided by the incident power (which for identical lasers equals the power available for stimulated emission in the quenched laser). Two identical lasers which quench each other with quenching ratios somewhat greater than unity have two stable states of operation.

Figure 1:
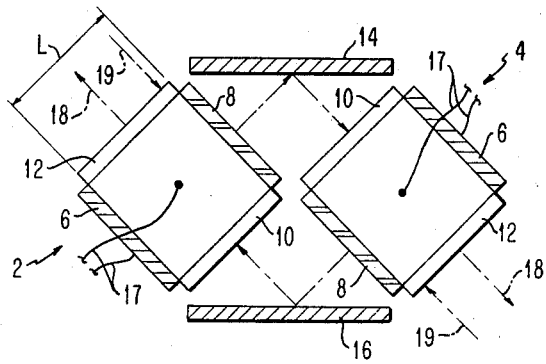
FIG. 1 is a drawing showing the preferred embodiment of the invention wherein two lasers are cross-coupled by the use of two external reflecting surfaces.

Quenching ratios greater than unity are achieved in the device shown in FIG. 1. Two essentially identical injection lasers 2 and 4 having a square cross-section of length are employed. The lasing mode of each is determined by having a completely reflecting coating 6 on one side and a coating 8 of controlled partial reflectively, R, on the opposite side. The two remaining sides bear nonreflecting (transmitting) coatings 10 and 12. The coherent light produced in laser 2 is directed to laser 4 by a reflecting surface 14 and, by virtue of nonreflecting coating 12 on laser 4, the quenching light is not reflected back to laser 2. Similarly, the light from laser 4 is directed to laser 2 by a reflecting surface 16. The lasers are conventionally excited, either by electric currents or optically. In the preferred embodiment of the invention, equal electric current excitation is applied to each laser through conductors 17. The optical outputs of the device are labelled with reference numerals 18 and the inputs with reference numerals 19. In operation, the status of the bistable device is switched by application of the externally produced beam 19 to quench the coherent light producing laser and, hence, to remove the quenching beam for the previously-quenched laser. The previously-quenched laser then develops a quenching output beam to maintain the other laser in its quenched state.

The threshold condition for either laser is:

$$e^{2gL}R = 1$$

where $g$ is the gain per unit length in the active region for diode currents equal to or greater than the threshold current. When the power P delivered by one laser (in the directional coherent beam) with a collection efficiency $n$ (that is, the fraction of the power emitted by one laser which passes through the active region of the other laser) is passed through the other laser, a power gain per unit length $g$ is experienced, resulting in emerging light 18 with power $nPe^{gL}$. The quenching ratio is then:

$$q = n(e^{gL} - 1) = n\left(\frac{1}{\sqrt{R}} - 1\right)$$

For perfect light collection, $n=1$, the reflectivity is less than ¼ to obtain a unit quenching ratio. Thus, the above expression establishes the maximum value of R that provides a quenching ratio that is greater than unity for a given collection efficiency $n$. (The reflectivity of an untreated GaAs-air surface is about 0.35.) The quenching ratio increases as reflectivity decreases because low reflectivity implies a large gain at and above threshold. Actually, with a quenching ratio greater than unity, the carrier densities and gain of the quenched laser are reduced because it effectively operates below threshold, and the quenching ratio is somewhat less than that described above. It is assumed that the gain and spontaneous emission do not vary with current above threshold current and that no internal reflecting modes exist with quality factors greater than that of the desired directional mode. This can be accomplished by roughening the sides 12 (FIG. 1) through which the quenching beams emerge, by slanting these surfaces to make acute angles with the planes of the junction of the laser, or by applying non-reflecting coatings of a quarter wave optical thickness of SiO or other suitable dielectric.

The coherent modes of injection lasers are observed to have the shape of narrow filaments which are consistent with the above description of quenching as it is believed that some very small variations of one or more of the optical or electrical properties of the crystal in the junction region gives certain modes a slightly lower threshold than modes which cover other regions of the junction. This power is extracted from the quenched laser by a narrow beam from the active filament of the quenching laser, but the current in the quenched laser is distributed to provide full gain in the part of the emitting region traversed by the beam.

In the preferred embodiment of the invention, as shown in FIG. 1, gallium arsenide lasers are employed. The lasers have square cross-sections with a side dimension of approximately 7–50 microns. The completely reflecting sides 6 are coated with SiO and then a reflecting metal such as aluminum, the partially reflecting sides 8 employ a controlled-thickness coating of SiO or other dielectric and, as described above, the non-reflecting sides 10 and 12 are coated with a quarter wave thickness of SiO or other suitable dielectric. The controlled-thickness coating for the partially reflecting sides is achieved by gradually evaporating a coating of SiO while measuring the reflectivity until a quenching ratio that is greater than 1 is realized.

Figure 3:
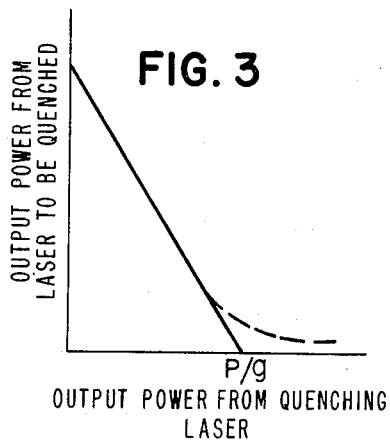
FIGS. 3 and 4 are diagrams showing certain characteristics of the operation of the embodiments of the invention.
Figure 4:
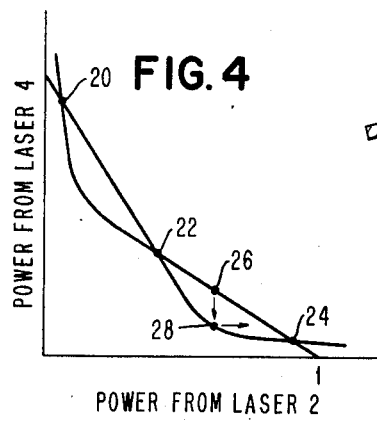

The operation of two lasers in a bistable device, as shown in FIG. 1, is based on the laser characteristics shown in FIGS. 3 and 4. The effect of variations of the output power of a quenching laser on the power output of a laser to be quenched (assuming only one directional coupling) is shown by the solid line in FIG. 3. The output of the laser to be quenched decreases linearly from its undisturbed value, P, to zero as the output of the quenching laser increases from zero to P divided by the quenching ratio $q$. The dashed line indicates how this function differs from the ideal for an actual laser due to spontaneous emission and a smooth transition between lasing and nonlasing regions of operation. When each laser is arranged to quench the other, their power outputs must satisfy the relation that is plotted in FIG. 3 and the relation is that obtained by exchanging the labels of the two axes. The two relations are plotted together in FIG. 4. The possible steady states of the system are the intersections 20, 22 and 24 of the two curves, where 20 and 24 are stable points of operation and where 22 is an unstable point. For example, when the instantaneous output is at point 26, the power output of laser 4 is too large and the operating point moves down. When the instantaneous output is at point 28, the output of laser 2 is too small and the operating point moves to the right. Thus a mutual quenching ratio somewhat greater than unity provides two stable states.

Since the quenching beam 18 (FIG. 1) emerges from the quenched laser with more than twice the power required to quench a single laser, each laser can switch two other such devices by beam splitting in a computing system which realizes logic or arithmetic operations.

Figure 2:
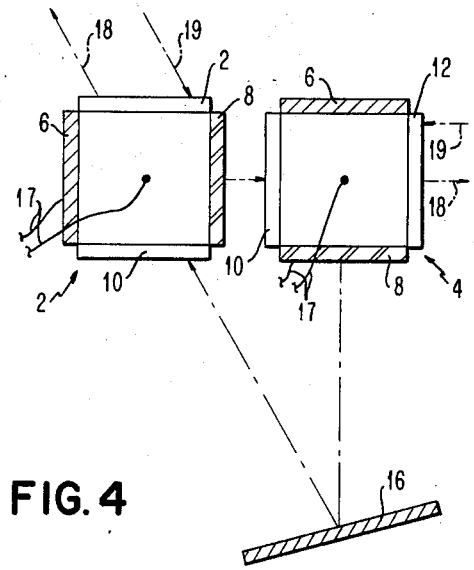
FIG. 2 is a drawing showing a second embodiment of the invention that uses only one external reflecting surface.

A second embodiment of the invention is shown in FIG. 2. In this embodiment only one external reflecting surface 16 is employed. A first laser 2 is arranged to provide quenching light for a direct application to a second laser 4. The quenching light from laser 4 is reflected by surface 16 to the first laser 2. Obviously, laser 4 can be tilted somewhat to cause the beam of light 18 to be applied to laser 2 more nearly perpendicular. Furthermore, the devices shown in FIGS. 1 and 2 may be modified by the use of additional reflecting surfaces. Light paths 18 form the optical outputs of the bistable device shown in FIG. 2.

Figure 5:
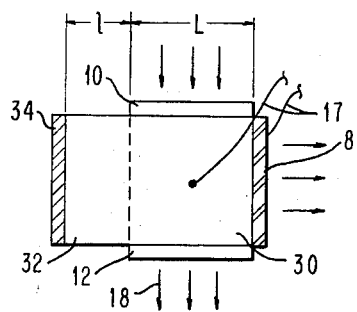
FIGS. 5 and 6 are diagrams showing other laser configurations that are suitable for use in the embodiments of the invention.
Figure 6:
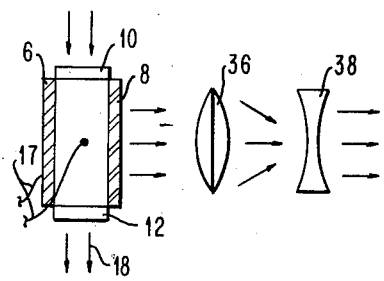

FIGS. 5 and 6 show other laser structures which are suitable for use in the embodiments of FIGS. 1 and 2. In FIG. 5, there is a square active region 30 with length L and gain per unit length, $g$ and an added region 32 of thickness, $l$, with absorption per unit length, $a$, between the active region 30 and the perfect reflector 34. The threshold condition is:

$$Re^{2(gL-al)} = 1$$

The power produced by stimulated emission is equal to the emitted power P plus the power internally absorbed:

$$P + P\left(\frac{R}{1-R}\right) \cdot (e^{gL}) \cdot (1 - e^{-2al})$$

where $PRe^{gL}/(1-R)$ is the power entering the absorbing region. The quenching ratio may be written as:

$$q = n\left[\frac{(R^{-1/2})(e^{al}) - 1}{1 + \left(\frac{2R^{1/2}}{1-R}\right)(\sinh al)}\right]$$

When $al$ is large, the quenching ratio approaches $n(1-R)/R$. Thus, the quenching ratios can be increased by raising the threshold current in both the laser in FIG. 5 as well as the laser in FIG. 1.

The most severe basic limitation on the collecting efficiency, $n$, arises from the diffraction spreading of the beam between the lasers in a direction perpendicular to the junctions. Thus, a sizeable $n$ is obtained when the distance between lasers does not exceed the square of the thickness of the active region divided by the wavelength of the radiation in the medium. Optical fibers or lenses can be used to increase $n$. The effect of spreading within the lasers is reduced by the existence of dielectric guided modes within the lasers as described in an article entitled Radiation Confinement in Semiconductor Lasers, by F. Stern in Proceedings of the Symposium on Radiative Recombination in Solids, Paris, July 27, 28, 1964.

Another method to improve quenching makes use of rectangular lasers emitting out of the broad side and then focused to pass through the long dimension of another laser, as shown in FIG. 6. In this case, the quenching ratio is:

$$q = n\left(\frac{1}{R^{L/21}} - 1\right)$$

Here the quenching ratio is increased by increasing the path length and hence the amplification in the quenched laser. Lenses 36 and 38 are used to direct the broad quenching beam to be quenched (not shown). Thus, the present invention shows the use of nonreflecting coatings to enable a first laser to efficiently quench a second laser. This feature permits a bistable device to be constructed by the use of two cross-coupled lasers.

While the invention has been particularly shown and described with reference to preferred embodiments thereof, it will be understood by those skilled in the art that various changes in form and details may be made therein without departing from the spirit and scope of the invention.

What is claimed is:
1. A bistable laser device comprising:
(a) first and second coupled lasers each including a body having reflecting surfaces at opposite ends and in which lasing light is produced in a cavity extending in a given direction between said reflecting surfaces when an excitation signal is applied to the laser;
(b) means for applying to said first and second lasers excitation signals above the threshold value to produce lasing in the individual lasers;
(c) at least one of the reflecting surfaces of each laser transmitting part of the lasing light produced in the laser to provide a coherent output beam from the laser;
(d) means for directing the coherent output beam of either of said lasers to the other of said lasers without reflection back to the light producing lasers, the directed beam being applied to the other laser as an input beam along a direction different than the said given direction in which said cavity extends in the other laser;
(e) each of said lasers including in the cavity extending in the given direction between the reflecting surfaces an active region and an absorbing region;
(f) said output beam of each laser being applied as an input beam to the other laser being directed in said different direction only along the active region of said other laser;
(g) each of said lasers amplifying a coherent beam applied as an input thereto from the other laser and by said amplifications causing the amplifying laser to be quenched;
(h) and means for applying light signals to said lasers to cause said coupled lasers to assume either a first stable state with the first laser lasing and the second laser quenched or a second stable state with the second laser lasing and the first laser quenched;

2. The laser device of claim 1 wherein the active regions of said lasers have square cross sections and the path along said given direction between said reflecting surfaces including both the active and absorbing regions in which the lasing is produced is larger than the path in said different direction along the active region only of the laser through which the coherent beam from the other laser is directed.

References Cited

UNITED STATES PATENTS

| 3,130,254 | 4/1964 | Sorokin et al. | 331—94.5 |
| 3,233,108 | 2/1966 | Rosenblum | 331—94.5 |
| 3,242,440 | 3/1966 | Koester et al. | 332—7.51 |
| 3,257,626 | 6/1966 | Marinace et al. | 331—94.5 |
| 3,270,291 | 8/1966 | Kosonocky | 331—94.5 |
| 3,431,437 | 3/1969 | Kosonocky | 331—94.5 |

OTHER REFERENCES

"Electronics," July 26, 1963, p. 57 and 58, title "One Gaas Laser is Quenched by Another."

RONALD L. WIBERT, Primary Examiner

V. P. McGRAW, Assistant Examiner

U.S. Cl. X.R.

331—94.5